United States Patent [19]
Baker et al.

[11] Patent Number: 5,846,589
[45] Date of Patent: *Dec. 8, 1998

[54] PROCESS OF MAKING A REDUCED OIL SNACK CHIP

[75] Inventors: John Edwin Baker, Farmers Branch; Steven Theodore Chandler, Lano; Chris J. Cornwell; Timothy Allen Johnson, both of Coppell; Harold Reed McKay, Jr., Plano, all of Tex.

[73] Assignee: Recot, Inc., Pleasanton, Calif.

[*] Notice: This patent issued on a continued prosecution application filed under 37 CFR 1.53(d), and is subject to the twenty year patent term provisions of 35 U.S.C. 154(a)(2).

[21] Appl. No.: 639,755

[22] Filed: Apr. 29, 1996

[51] Int. Cl.$^6$ ........................................................ A23L 1/01
[52] U.S. Cl. .......................... 426/439; 426/438; 426/403; 426/550; 426/804; 426/808
[58] Field of Search ...................................... 426/438, 439, 426/441, 443, 804, 805, 455, 550, 808

[56] References Cited

U.S. PATENT DOCUMENTS

| | | | |
|---|---|---|---|
| 4,224,350 | 9/1980 | Merck | 426/473 |
| 4,277,510 | 7/1981 | Wicklund et al. | 426/441 |
| 4,721,625 | 1/1988 | Lee et al. | 426/438 |
| 4,756,916 | 7/1988 | Dreher et al. | 426/302 |
| 4,933,199 | 6/1990 | Neel et al. | 426/438 |
| 5,171,600 | 12/1992 | Young et al. | 426/550 |
| 5,180,601 | 1/1993 | Gaon et al. | 426/242 |
| 5,298,274 | 3/1994 | Khalsa | 426/560 |
| 5,312,635 | 5/1994 | Kazlas et al. | 426/438 |

*Primary Examiner*—Lien Tran
*Attorney, Agent, or Firm*—Rothwell, Figg, Ernst & Kurz

[57] ABSTRACT

A process for preparing a low-oil Masa-based snack chip is disclosed. Baked and proofed chip-shaped masa pieces are introduced in a substantially monolayered array into a continuous flow frier. The pieces are par-fried in oil, while being maintained in a substantially monolayered array, then finish fried until the moisture content thereof reaches a predetermined level. The finished masa pieces are removed from the frier in a substantially vertical orientation and contacted, while in a substantially vertical orientation, with super-heated steam, whereby oil is partially removed from the masa pieces. If necessary to attain a preselected final moisture content and to equilibrate moisture throughout the chip bed, the steam-contacted masa pieces are dehydrated to attain a snack chip with a preselected final moisture content.

23 Claims, No Drawings

PROCESS OF MAKING A REDUCED OIL SNACK CHIP

BACKGROUND OF THE INVENTION

1. Technical Field

The present invention relates to processes for the production of masa-based snack chips that have a reduced oil content relative to masa-based snack chips made by conventional processes.

2. Description of the Background Art

Masa-based snack chips are well-known in the snack food industry. Masa is prepared from whole kernel raw maize. Raw maize is first briefly cooked, then soaked in water with lime, then ground to produce a product having a relatively high moisture content. Masa can be "sheeted" into a thin layer and cut into various shapes to make tortillas, tortilla chips, etc. The chip-shaped masa piece typically is lightly baked or "crusted" to reduce its moisture content, then "proofed" to equilibrate moisture levels throughout, then fried and optionally seasoned to produce a finished product.

On a commercial scale, conventional frying methods involve the use of continuous fryers. In a conventional continuous fryer, oil is pumped through the frier, carrying the material to be fried from the point of input of the raw material to the point of output of the fried product. Masa-based snack chips are typically introduced into a continuous frier in a multilayered packed configuration as they emerge from the proofing stage, to be separated and partially submerged in a first section of the frier by a series of wheels or paddles suspended from a carriage above into the flow of oil. These paddles tend to slow the movement of chips through the continuous frier and do not reliably separate individual masa pieces, leading to aggregation. The final stage in a conventional continuous fryer involves passing the chips under a submerger for a brief period of total oil submersion prior to removal of the fully-cooked chips.

Masa-based chips prepared in this conventional manner undergo no further processing, other than optional seasoning, and typically have an oil content of about 25% by weight.

It has become desirable, partly for health reasons, to produce snack foods with reduced fat content. To this end, technology has been developed in the potato chip industry to remove oil from potato chips after frying. Neel & Reed, U.S. Pat. No. 4,933,199 discloses an apparatus and a process for preparing low-oil potato chips that employ super-heated steam to remove oil from the surface of a potato chip after frying. The de-oiling apparatus contacts the chips with super-heated steam at temperatures ranging from about 149° C. to about 171° C., with impinging velocities between about 488 m/min and about 670 m/min and within a reduced oxygen environment to remove oil from the potato chips. The processed chips have less than about 25% oil by weight and a moisture content of about 3.5% by weight. The processed chips are subjected to a dehydrating process to further reduce the moisture content to less than 2% by weight.

There remains a need for a commercial scale, high volume process for producing a low-oil masa-based snack chip.

SUMMARY OF INVENTION

The present invention involves the use of a two-stage frying process for frying masa-based snack chips. The two stage frying process is followed by contacting the chips with super-heated steam to remove a portion of the oil from the surface of the fried chip, and then, if necessary, drying the de-oiled chips to a pre-determined final moisture content. The resulting chip has good surface blistering and a moisture content similar to chips made by conventional processes, but an oil content that is significantly lower than such chips. The present invention can be used to produce snack chips from chip-shaped masa pieces that are prepared using per se known conventional methods. Snack chips prepared by the processes of the invention can optionally be coated with a seasoning as a final process step.

DETAILED DESCRIPTION

The present invention provides a process for preparing a low-oil masa-based snack chip (such as a tortilla chip), comprising the steps of 1) introducing conventionally baked and proofed masa pieces into a continuous flow fryer in substantially a monolayer array, 2) par-frying the masa pieces under conditions that maintain the masa pieces substantially in a monolayer, 3) finish frying the par-fried masa pieces until the moisture content thereof reaches a predetermined level, 4) removing the finish-fried masa pieces from the frier in a substantially vertical orientation, 5) contacting the finished masa pieces, while in a substantially vertical orientation, with super-heated steam, whereby oil is partially removed from the masa pieces, and finally, if necessary, 6) dehydrating the steam-contacted masa pieces to attain a snack chip with a preselected final moisture content. Optionally, a seasoning can be applied to the snack chips as a final process step.

The masa used to make the chip-shaped pieces can be made by any conventional method from any suitable type of maize grain. Once prepared, the masa can be formed into chip-shaped pieces, then baked and proofed using conventional methods. During baking, or "crusting," the masa pieces partially dehydrate until a desired moisture content is obtained. During proofing the moisture levels equilibrate within the pieces. A preferred moisture content at this stage is between about 34% and about 38% by weight, with a most preferred moisture content of about 36% by weight.

Once prepared, the chip-shaped masa pieces are supplied to a continuous frying apparatus, preferably in substantially a monolayer array. By "substantially a monolayer array," it is meant that the goal of the process is to provide an array of masa pieces entering the frier such that there is no contact among the pieces. Inasmuch as contact cannot be totally eliminated, it nevertheless is kept to a minimum. The monolayer configuration of the masa pieces is preferred as it allows immediate and thorough contact of the surfaces of the masa pieces with the oil of the frying apparatus, without having to wait for mechanical separation, and permits even par-frying of the masa pieces with good surface blister formation.

Any conventional continuous frier apparatus can be used that allows control of the velocity at which the oil flows through the apparatus and control of the velocity at which the chips move through the apparatus. The apparatus preferably comprises an infeed conveyer supplying masa pieces to the frier, an initial fry zone permitting free-frying of the masa pieces in a substantial monolayer, and a second fry zone for submerging the masa pieces wherein the masa pieces are finish-fried in a packed configuration, prior to their removal from the frier via a take-out conveyer. In one possible embodiment, the initial fry zone incorporates a paddle wheel or similar device, rotating in the direction of oil flow at a tangential velocity greater than the surface velocity of the oil, permitting further separation of masa pieces which might be on top of each other as they are introduced into the frier. A preferred embodiment of the second fry zone incorporates a variable speed submerger device that permits adjustment of the ratio between the speed of chip movement through the frier at this stage ("submerger speed") and the speed at which the finish-fried masa pieces are removed from the frier ("take-out speed"). A preferred ratio of submerger speed to take-out speed is about 7 to 1. The ability to adjust the speed ratio between submerger and take-out speeds aids in producing a preferred packed configuration during the finish frying, and in producing a preferred configuration for removal of the masa pieces to the next process step wherein the masa pieces are in a substantially vertical orientation.

An oil temperature in the continuous frying apparatus of between about 330° F. and about 380° F. is suitable for the present invention. Oil temperatures between about 350° F. and about 360° F. are preferred, and a temperature of about 355° F. is not preferred. A preferred oil flow rate in the continuous frier is that necessary to achieve about a 7–12 second free fry time of the masa pieces in the first section of the fryer. A most preferred oil flow rate is one that achieves a 10 second free fry time.

After introduction into such a frier, the masa pieces are fried in a two-stage process to form chips. In a first par-frying stage, the pieces are allowed to free-fry in substantially a monolayer. This first stage aids in separation of the masa pieces and enhances desirable blister development. The duration of this par-fry stage can be as brief as about 7–12 seconds at a bed loading of about 0.15 to about 0.20 pounds per square foot of surface fry area, with 10 seconds being a preferred duration at this stage.

In the second, finish-fry stage, the masa pieces are substantially submerged. The duration of this finish-fry stage also can be as brief as about 7–12 seconds, preferably 10 seconds in length. In the finish-fry stage the masa pieces are preferably cooked to a moisture content that is greater than normal for this stage in a conventional process, so that oil absorption into the chips is reduced or limited. A preferred moisture content at this stage is in the range of about 1.5% to about 4.5% by weight, with a most preferred moisture content of about 3% by weight.

After the finish-fry stage the chips are preferably removed from the frier in a packed chip bed wherein the chips have a substantially vertical orientation. This can be accomplished by adjusting the ratio of submerger speed to take-out speed, as indicated above, or by any other suitable means that results in the masa pieces attaining a substantially vertical orientation. By "a substantially vertical orientation" it is meant that the goal of the process is to have the bed of masa chips oriented as vertically as their shape permits. The efficiency of the de-oiling step is greatly increased by such a vertical orientation, and in as much as perfect homogeneity cannot be achieved, it is desirable to have as near to uniformity in this regard as possible.

The chip bed of substantially vertically-oriented chips is then introduced into a de-oiling chamber, where it is contacted with super-heated steam to remove surface oil from the chip surfaces. High velocity super-heated steam is passed through the chip bed to blow or strip away surface oil. The temperature of the steam is preferably maintained in the range between about 300° F. and about 345° F., most preferably at about 340° F. Temperatures as low as about 315° F. to about 320° F. have been successfully used with larger-scale de-oiling equipment. The steam flow velocity is preferably adjusted between about 1200 and about 2200 feet per minute, and most preferably to about 1800 feet per minute. Preferably, the oil droplets suspended in the steam flow are subsequently removed by a collector. The steam flow can then be recirculated back to the chip bed for use in additional oil stripping, and the oil removed from the steam flow can be collected and transferred back to the frier for re-use during frying. The oxygen level in the de-oiling chamber is preferably maintained below about 2.0% by volume in order to minimize oxidation of the stripped oil and maintain its quality for re-use. Apparatuses and methods suitable for use in this step are known in the potato chip art, and are disclosed in Neel and Reed, U.S. Pat. No. 4,933,199, discussed above and incorporated herein by reference.

The rapid fry time, coupled with the use of the steam-contacting step results in a chip product with significantly less oil than a comparable chip produced by conventional processes. Typically, masa-based chips produced by conventional methods comprise between about 20% and about 26% oil by weight. With the present invention, masa-based chips can be produced having between about 13% and about 16% oil by weight.

At this stage, these low-oil chips may not be completely dried to their predetermined final moisture content, and may have some moisture variability throughout the chip bed. Therefore the chips are preferably further dried (for example, in a conventional oven) to their predetermined final moisture content using conventional means such as a finishing dryer oven. A preferred final moisture content is between about 0.8% and about 1.4% by weight, with a most preferred final moisture content of about 1.1% by weight. Once the predetermined final moisture content of the chips has been reached, they can optionally be seasoned using any per se known seasonings and seasoning technologies.

The following example is intended to illustrate, but in no way to limit the scope of, the present invention.

EXAMPLE 1

Whole kernel maize was processed using standard techniques to produce masa having a moisture content of about 50% by weight. The masa was sheeted and cut into chip-shaped pieces using standard equipment. The raw chips were passed through a conventional crusting oven to obtain a moisture content of about 38% by weight. The masa pieces were then proofed for about 2–3 minutes to equilibrate moisture content throughout.

After proofing, the chip-shaped masa pieces were provided in substantially a monolayer and introduced into a pilot-scale conventional continuous frier (Heat & Control model PC-4) having the following modifications. The paddle wheel section was removed, leaving the submerger section in place. The effective length of the fry bed for the initial free-fry stage was reduced by about 50% by moving the infeed conveyer to a position midway along the portion of the frier bed beneath where the paddle wheels are normally located.

The operation of the frier was controlled so as to provide the following parameters:

oil flow rate=200 gal./min. (±5 gal./min.)

oil temperature=355° F.

infeed conveyer=75 ft./min.

The speeds of the submerger and the take-out belt were adjusted to achieve a ratio of submerger speed to take-out speed of about 7 to 1. The oil flow rate achieved an approximately 10 second free-fry stage, during which the masa pieces were further separated from one another by the oil flow and maintained substantially in a monolayer on the oil surface. The pieces were then finish-fried in the submerged section for an additional approximately 10 seconds. The ratio of submerger to take-out speeds caused the chips to form a packed chip bed with the individual chips substantially in a vertical orientation at the take-out belt of the frier.

The resulting chips had a moisture content of about 3% by weight and an oil content of about 23% by weight, and good blistering of the chip surface.

The chips subsequently were passed in a substantially vertical orientation through a pilot scale de-oiling chamber (Heat & Control model LOC-300) with a dwell time of approximately 75 seconds. In the de-oiling chamber superheated steam (about 340° F.) was passed through the chip bed at an impinging velocity of about 1800 feet per minute to strip oil from the surface of the chips. Oxygen levels in the de-oiling chamber were maintained at about 1.7% by volume in order to minimize oxidation of the stripped oil. Oil droplets suspended in the steam were removed by a collector in the de-oiling chamber, the steam flow then being circulated back to the chip bed for additional stripping. The oil was pumped out from the collector for re-use. The resulting chips had an oil content of about 14.5% by weight and a moisture content of about 1.5% by weight.

The de-oiled chips were then passed through a conventional three-pass downdraft finishing dryer (Wenger Series IV model 2400) with a total dwell time of 4 min at about 275° F. to obtain a finished chip having an oil content of about 15% by weight and a moisture content of about 1% by weight.

Standard seasoning techniques were used to apply both "Cool Ranch" and "Nacho Cheese" seasoning, resulting in low-oil chips with a crisp consistency and good seasoning adhesion.

We claim:

1. A process for preparing a low-oil masa-based snack chip, comprising:

introducing a substantially monolayered free array of baked and proofed masa pieces into a continuous flow frier;

par-frying the proofed masa pieces in oil while maintaining the masa pieces in a free-frying, substantially monolayered array;

finish frying the par-fried masa pieces while maintaining the pieces in a free-frying state until the moisture content thereof reaches a predetermined level;

removing the finished masa pieces from the frier as a packed bed, the individual pieces within the bed being in a substantially vertical orientation;

contacting the finished masa pieces with super-heated steam, each of the individual pieces within the bed being in a substantially vertical orientation, whereby oil is partially removed from the masa pieces.

2. The process of claim 1 wherein the masa pieces are submerged during the finish frying step.

3. The process of claim 1 wherein the masa pieces are moved through the par-frying stage solely due to flow of the frying oil through the continuous flow frier.

4. The process of claim 1 wherein the masa pieces move in the finish-frying step at a submerger velocity and the masa pieces are removed from the fryer at the end of the finish frying step at a take-out velocity, the ratio of the submerger velocity to the take-out velocity being adjusted so that the masa pieces are removed at the end of the finish frying step as a packed bed, the individual pieces within the bed being in a substantially vertical orientation.

5. The process of claim 1 wherein the oil in the par-frying and finish frying stages is at a temperature of between about 350° F. and about 360° F.

6. The process of claim 5 wherein the temperature is about 355° F.

7. The process of claim 1 wherein the par-frying stage is about 7 seconds to about 12 seconds in length.

8. The process of claim 1 wherein the finish frying stage is about 7 seconds to about 12 seconds in length.

9. The process of claim 1 wherein the masa pieces after contact with the super-heated steam have an oil content of from about 13% to about 16% by weight.

10. The process of claim 1 wherein the masa pieces after contact with the super-heated steam have an oil content of about 14.5% by weight.

11. The process of claim 1 wherein oxygen is maintained in the steam-contacting stage at a level below about 2.0% by volume.

12. The process of claim 1 wherein the temperature of the super-heated steam in the steam-contacting stage is maintained between about 300° F. and about 345° F.

13. The process of claim 12 wherein the temperature of the super-heated steam in the steam-contacting stage is maintained at about 340° F.

14. The process of claim 12 wherein the temperature of the super-heated steam in the steam-contacting stage is maintained at about 315° F.

15. The process of claim 12 wherein the temperature of the super-heated steam in the steam-contacting stage is maintained at about 320° F.

16. The process of claim 1 wherein the super-heated steam is delivered at a velocity between about 1200 feet per minute and about 2200 feet per minute.

17. The process of claim 16 wherein the super-heated steam is delivered at a velocity of about 1800 feet per minute.

18. The process of claim 1 wherein the predetermined level of the moisture content of the baked and proofed masa pieces is between about 34% and about 38% by weight.

19. The process of claim 18 wherein the predetermined level of the moisture content of the baked and proofed masa pieces is about 36% by weight.

20. The process of claim 1 wherein the predetermined level of the moisture content after finish frying is between about 1.5% and about 4.5% by weight.

21. The process of claim 20 wherein the predetermined level of the moisture content after finish frying is about 3% by weight.

22. The process of claim 1 comprising the additional step of dehydrating the steam-contacted masa pieces to attain a snack chip with a preselected final moisture content.

23. The process of claim 1 comprising the additional step of adding a seasoning to the snack chip.

* * * * *